US012179242B2

(12) United States Patent
Lepold

(10) Patent No.: US 12,179,242 B2
(45) Date of Patent: Dec. 31, 2024

(54) AUTOMATIC SELF-CLEANING DRAINAGE SYSTEM FOR A TUNNEL INSTALLATION

(71) Applicant: DRAINBOT GMBH, Eggersdorf bei Graz (AT)

(72) Inventor: Philipp Lepold, Graz (AT)

(73) Assignee: DRAINBOT GMBH, Eggersdorf bei Graz (AT)

( * ) Notice: Subject to any disclaimer, the term of this patent is extended or adjusted under 35 U.S.C. 154(b) by 0 days.

(21) Appl. No.: 17/754,751

(22) PCT Filed: Oct. 17, 2019

(86) PCT No.: PCT/AT2019/060346
§ 371 (c)(1),
(2) Date: Apr. 11, 2022

(87) PCT Pub. No.: WO2021/072459
PCT Pub. Date: Apr. 22, 2021

(65) Prior Publication Data
US 2024/0082892 A1 Mar. 14, 2024

(51) Int. Cl.
*B08B 9/049* (2006.01)

(52) U.S. Cl.
CPC .................................... *B08B 9/049* (2013.01)

(58) Field of Classification Search
CPC ........... B08B 9/049; B08B 9/02; B08B 9/027; B08B 9/04
See application file for complete search history.

(56) References Cited

FOREIGN PATENT DOCUMENTS

| | | | |
|---|---|---|---|
| CN | 109577472 | A | 4/2019 |
| CN | 110142265 | A | 8/2019 |
| EP | 0862682 | A2 | 9/1998 |
| EP | 3268828 | A1 | 1/2018 |
| JP | 1995280567 | A | 10/1995 |
| JP | 1996266667 | A | 10/1996 |
| JP | 2003013700 | A | 1/2003 |
| JP | 2018082732 | A | 5/2018 |
| JP | 2019075165 | A | 5/2019 |
| WO | 9812417 | A2 | 3/1998 |
| WO | 2016144627 | A1 | 9/2016 |
| WO | 2018/050968 | A1 | 3/2018 |

OTHER PUBLICATIONS

Japanese Office Action, mailed Nov. 30, 2023, from Japan Patent App. No. 2022-522613, 7 pages.
Chinese Second Office Action, mailed Aug. 16, 2023, from China Patent App. No. 201980101669.0, 19 pages.
International Search Report, European International Search Authority, mailed Jul. 6, 2020, from PCT/AT2019/060346 filed Oct. 17, 2019.

*Primary Examiner* — Shay Karls
(74) *Attorney, Agent, or Firm* — Workman Nydegger

(57) ABSTRACT

A drainage cleaning system is provided for a tunnel system, where the drainage cleaning system includes a drainage pipe, where the drainage cleaning system includes a charging station on the drainage pipe, and where the charging station is operable to charge the battery of a self-propelled cleaning robot located in the drainage pipe and to allow measuring data recorded by the cleaning robot to be sent to a server arranged outside of the drainage cleaning system.

13 Claims, 3 Drawing Sheets

AUTOMATIC SELF-CLEANING DRAINAGE SYSTEM FOR A TUNNEL INSTALLATION

The invention relates to a drainage cleaning system for a tunnel system or structure, comprising at least one underground drainage pipe. In further aspects, the invention relates to a self-propelled cleaning robot for said drainage cleaning system and a self-cleaning drainage system comprising said drainage cleaning system and said self-propelled cleaning robot.

As is generally known, tunnels are built through mountains or similar stone massifs in order to lay, for example, roadways through the mountain. However, in doing so, the problem arises that water running off the mountain flows into the tunnel, causing flooding of the roadway. For this reason, as is known from the prior art, drainage systems are installed underneath the roadway, which receive water running off the mountain underneath the roadway in order to ensure safe operation of the roadway.

In order to clean these drainage systems, for example, by removing gravel introduced into the drainage system or deposits on the drainage pipe, devices for cleaning pipelines of the drainage system, which have hydrodynamic tools or, respectively, nozzles, are used in the prior art. These devices always have a hose or, respectively, a cable for driving the device. As a result, these systems are limited in their length of use, since the available hoses and, respectively, cables only have a certain length. Furthermore, spatial conditions are very limited, especially in tunnel systems, for which reason the existing drainage systems are very limited in terms of their size so that the lengths of use are reduced.

Another problem that arises in particular in tunnel systems is that the existing systems of the prior art have to be introduced into the pipe by an employee on site. Especially in busy tunnel systems, this causes off-times during operation and, respectively, is extremely dangerous with the operation of the tunnel systems running.

From unrelated fields of technology, e.g., ventilation shafts in buildings as described in the documents DE 692 21 161 T2, KR 10-2015-0064565 A, KR 10-0190751 B1 and EP 3 315 219 A1, it is known, for example, to clean the air shafts by means of cleaning robots which are not driven hydrodynamically.

It is known from U.S. Pat. No. 7,7993,469 B1 to use a wired cleaning robot for sewer cleaning, which, however, is used, on the other hand, in sewer openings so that its travel length is limited by the cable it carries.

It is furthermore known from the documents cited above to record measuring data during cleaning or, respectively, to carry along a camera in order to obtain information about the soiling of the shaft to be cleaned. However, this has so far hardly been feasible in case of drainage systems for tunnel systems, since a suitable reception for wireless data transmission is not provided as a result of the fact that the drainage system is installed underneath the tunnel. A solution to this would be to read out recorded data manually via an interface after the cleaning device has been removed, which, however, again involves the disadvantage that employees have to remove the cleaning device from the drainage system.

It is therefore the object of the invention to create a drainage cleaning system or, respectively, a cleaning robot and a self-cleaning drainage system which overcome the disadvantages of the prior art and, in particular, enable an independent operation without manual intervention.

According to a first aspect of the invention, this is achieved by a drainage cleaning system for a tunnel system, the drainage cleaning system comprising at least one drainage pipe, the drainage cleaning system comprising at least one charging station on said drainage pipe, wherein the charging station is designed for charging the battery of a self-propelled cleaning robot located in the drainage pipe and for allowing measuring data recorded by the cleaning robot to be sent to a server arranged outside of the drainage cleaning system.

Firstly, the drainage cleaning system according to the invention has the advantage that it is equipped with at least one charging station which is able to charge cleaning robots located in the drainage cleaning system. As a result, for the first time, a drainage cleaning system can be obtained which can be cleaned without devices with hydrodynamic drives or, respectively, wired drives. In this way, the overall length of the drainage cleaning system can also be increased, since cleaning devices no longer have to be inserted manually at one end of the drainage cleaning system.

The second advantage of the drainage cleaning system is that the data-transmitting charging station allows information about the drainage cleaning system for the first time to be made available to the server continuously, i.e., every time the cleaning robot docks to the charging station and not just during manual cleaning operations, which so far has not been possible due to the poor data connection in drainage systems.

Overall, the drainage cleaning system with integrated charging station creates a system in which, in cooperation with the self-propelled cleaning robot, a completely self-sufficient drainage cleaning system is created, which continuously cleans itself without human intervention. In this way, it is accomplished, on the one hand, that a driving operation within the tunnel no longer has to be interrupted and, on the other hand, improved cleaning is achieved, since the self-propelled cleaning robot interrupts its cleaning work only for the charging process, which, among other things, leads to fewer deposits accumulating in the drainage cleaning system.

Furthermore, the drainage cleaning system preferably has at least one communication station on the drainage pipe, the communication station being designed for receiving measuring data recorded by the cleaning robot and for sending them to the above-mentioned server without charging the cleaning robot. This communication station is provided without a charging function, which is why the cleaning robot can remain on the communication station for a shorter time in order to send the measuring data to the latter. For example, it may be envisaged that the communication station is arranged at one end of the drainage cleaning system, i.e., at a reversal point during the cleaning of the cleaning robot.

Furthermore, the drainage cleaning system preferably comprises at least two of the above-mentioned charging stations, which are spaced apart from one another by a predetermined minimum distance. In this way, an effectively longer drainage cleaning system is rendered possible than would be possible for cleaning with wired cleaning devices.

The distance between two charging stations is advantageously less than or, respectively, at most half the capacity of the cleaning robot's battery so that the cleaning robot can return to the last charging station if there is an obstacle just before a charging station. For example, the charging stations are arranged at a mutual distance of 50 m to 1000 m, preferably 450 m to 600 m, which corresponds to half of typical battery capacities.

In order to enable measuring data recorded by the cleaning robot to be sent to the server arranged outside of the drainage system, the cleaning robot can have its own transceiver, for example. If, for example, the cleaning robot is transported out of the inner diameter of the drainage pipe, in which there is usually no adequate communication link to the server, by the charging station as described, the cleaning robot can be brought into a position in which a communication link to the server is provided. Alternatively, the charging station can provide, for example, an antenna to which the transceiver of the cleaning robot can couple so that recorded measuring data can be sent to the server.

However, the charging station preferably comprises a transceiver which is designed for receiving measuring data recorded by the cleaning robot and for sending them to a server arranged outside of the drainage system. This has the advantage that the cleaning robots can be designed in a simple and cost-efficient manner and that it is possible to determine at any time as to whether a data connection between the charging station and the server exists, i.e., the integrity of the communication link can be checked continuously.

In the case mentioned, the connection of the charging station to the server can, for example, be wired, if the server is arranged in the vicinity of the tunnel, for example. In a preferred embodiment, however, the charging station is designed for sending the measuring data to the server using a wireless connection, preferably using a mobile radio connection. Firstly, this reduces the effort required for installing the charging station, since no cables need to be laid, and, secondly, it is rendered possible that all of a provider's charging stations send measuring data to a central server in a simple manner.

The charging station is particularly preferably arranged outside of an inner diameter of the drainage pipe and is designed for transporting the cleaning robot out of the inner diameter in order to charge it outside of the inner diameter. For example, the charging station can lift the cleaning robot out of the drainage pipe. This has the effect that the inner diameter is freely accessible while the cleaning robot's battery is being charged so that waste water can flow off unhindered through the drainage pipe. In this connection, it should be noted that the cleaning robot does not cause any obstacles during cleaning, since its rotating brush allows water to flow through the drainage pipe and even promotes the drainage of the waste water if the brush is designed appropriately.

Furthermore, the charging station is advantageously designed for sending control data received by the server to the cleaning robot in order to change an operating state of the cleaning robot. In this way, it is rendered possible that the data flow between the cleaning robot and the charging station becomes bidirectional in order to move the cleaning robot manually, for example, from an operating state with a low brush speed into an operating state with a high brush speed. It is thus possible to react individually to certain obstacles or contaminants without manually removing the cleaning robot from the drainage system for reprogramming.

In a second aspect, the invention relates to a self-propelled cleaning robot for a drainage cleaning system according to any of the above-mentioned embodiments, comprising a drive for the automated cleaning of the drainage system, a battery for the drive and at least one sensor for recording measuring data, the cleaning robot being designed for charging the battery using the charging station and sending measuring data recorded by the sensor to the charging station.

Said cleaning robot thus creates the possibility for the first time to act self-sufficiently within a drainage system, i.e., to charge itself independently and, at the same time, to transmit measuring data to a server at regular intervals despite the poor data connections in a drainage system. For example, the battery can simultaneously represent an energy supply for the traction drive and for a cleaning drive, e.g., a brush. The drive may comprise, for example, a controller such as a processor with a program memory so that the cleaning robot navigates across the entire drainage system according to a pre-installed program, cleaning it in the process.

The cleaning robot preferably comprises a brush which, in operation, has a diameter of 100 mm to 500 mm, with the cleaning robot furthermore having a travelling body which is located within the circumference of the brush, as seen in the direction of travel. The circumference of the brush is generally obtained by rotating the brush about an axis that essentially corresponds to the direction of travel of the cleaning robot. The diameter of the brush advantageously corresponds to an inner diameter of the drainage pipe in order to enable the inner diameter of the drainage pipe to be completely cleaned in a single passage.

In an advantageous embodiment, the recorded measuring data include slope data by means of which a lowering of the drainage pipe can be determined. In comparison to the unrelated state of the art in which only cleaning-specific measuring data about soiling are recorded, the recording of the slope data permits an analysis as to whether parts of the drainage system sink down over time, which also allows conclusions to be drawn about the condition of the roadway itself above the drainage system. In addition to cleaning, the cleaning robot can thus be used for quality control of the entire tunnel structure or, respectively, the entire tunnel system.

Additionally or alternatively, the measuring data can also include temperatures, pH values, electrical conductivity, measurements of distances travelled and image and/or video data recorded by a camera for monitoring the cleaning success. The measuring data can either be evaluated automatically, for example, in the charging station, in the server or in the cleaning system itself. In response to the measuring data, an operating state of the cleaning robot can be changed automatically or manually, for example, in order to clean individual impurities more rigorously.

The battery preferably has a capacity which enables moving across a distance of 100 m-2000 m, preferably 450 m-1200 m, driving meters with the cleaning robot in the drainage pipe. In most embodiments, this corresponds to at least twice the length between two charging stations so that there is still enough battery capacity to turn around if there is an obstacle in front of a charging station and still reach the last charging station.

In order to achieve this, the cleaning robot can be designed for going to the last charging station that has been visited when an insurmountable obstacle is detected in the drainage system and for sending an error message to the server upon reaching the charging station. Such obstacles can be removed, for example, manually, which, however, can take place in a specific manner, since the position of the obstacle will usually be known from the measuring data recorded by the cleaning vehicle.

As already explained, the cleaning robot can preferably comprise a transceiver which is designed for sending recorded measuring data directly, i.e., not via a transceiver of the charging station, to the server when the cleaning robot is in the charging station. This increases the security of the data connection, since the charging station is not used as a third party means for establishing communication.

Thus, the drainage cleaning system according to the invention, which comprises a charging station, and the self-propelled cleaning robot according to the invention together form a self-cleaning drainage system, which has the above-described advantages.

Preferably, two or more cleaning robots can even be provided in this self-cleaning drainage system, for example, if the drainage system has a large length.

Advantageous and non-limiting embodiments of the invention are explained in further detail below with reference to the drawings.

Figure 1:
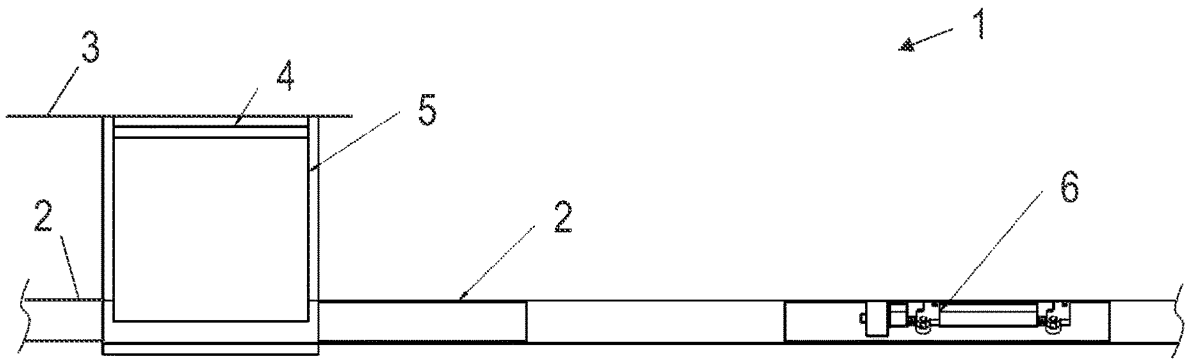
FIG. 1 shows a self-cleaning drainage system with a cleaning robot and a charging station.
Figure 2:
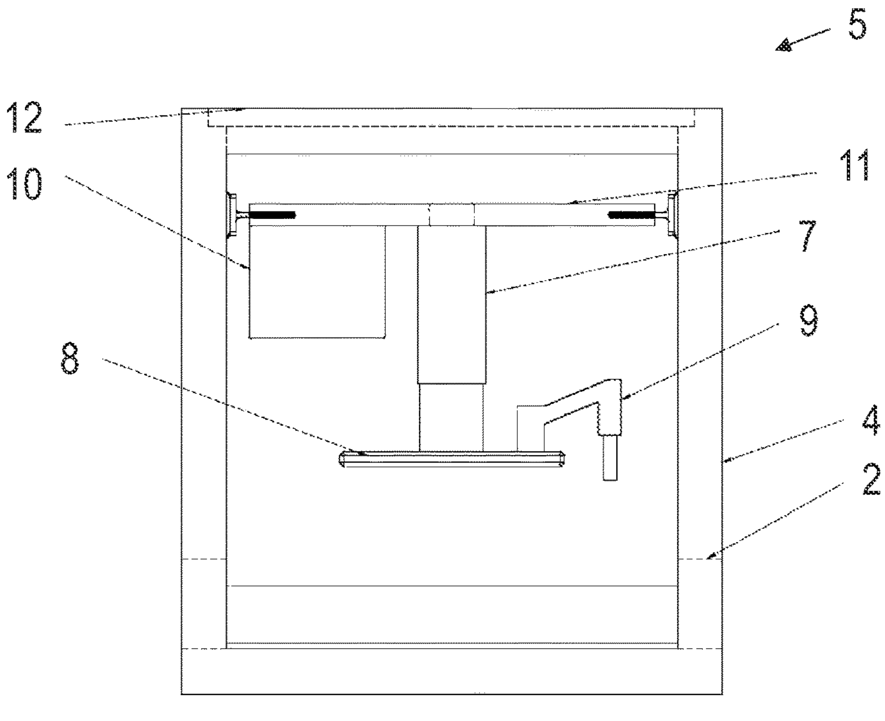
FIG. 2 shows the charging station of FIG. 1 in a side view.
Figure 3:
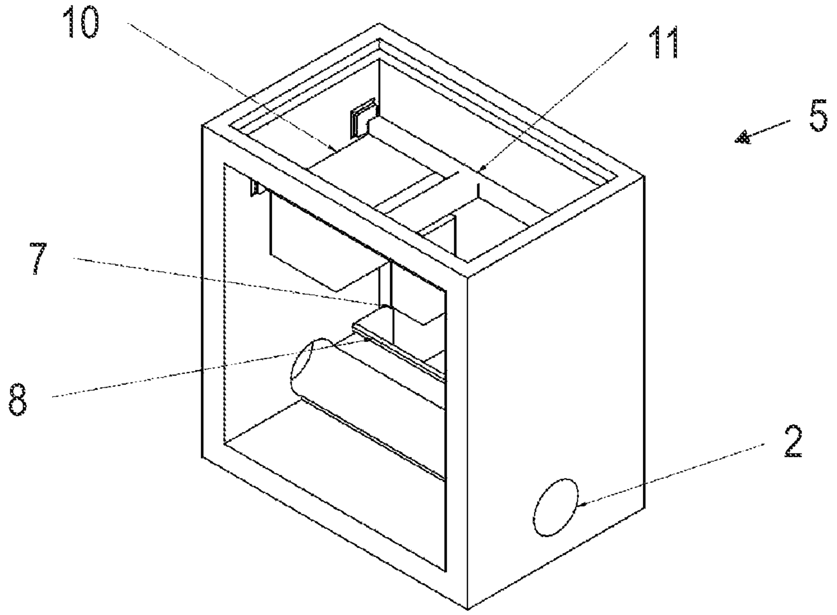
FIG. 3 shows the charging station of FIG. 1 in a first perspective view.
Figure 4:
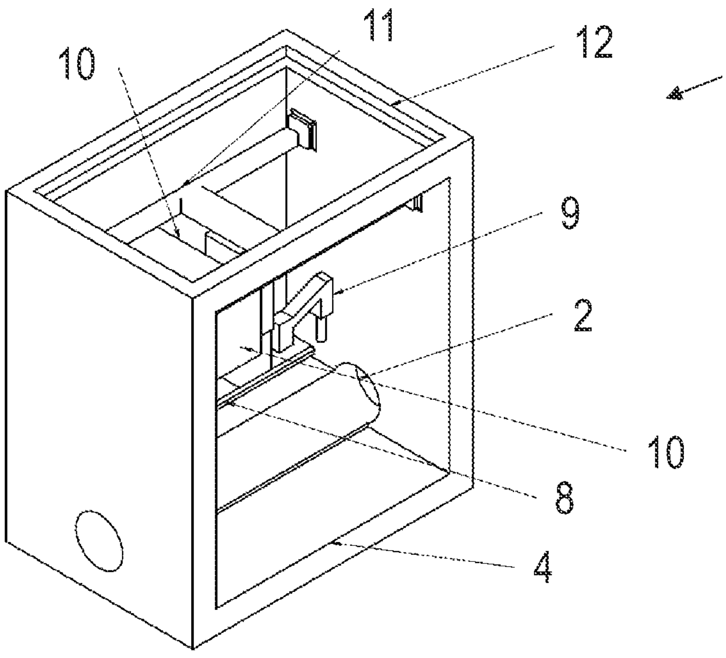
FIG. 4 shows the charging station of FIG. 1 in a second perspective view.
Figure 5:
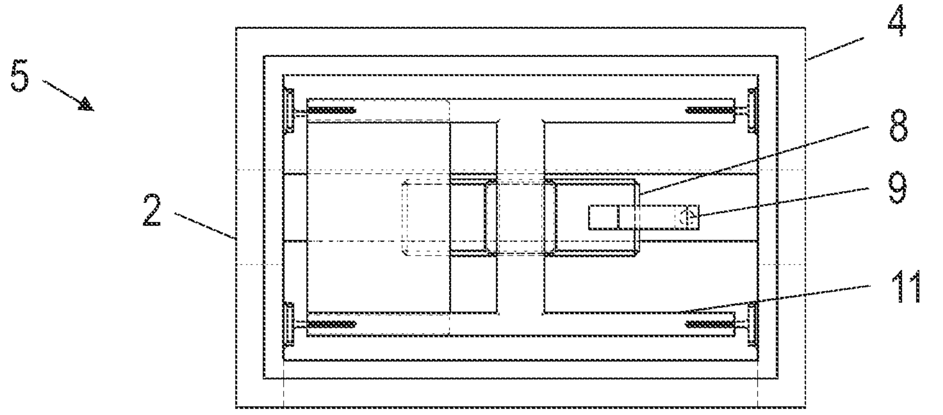
FIG. 5 shows the charging station of FIG. 1 in a plan view.

FIG. 1 shows a self-cleaning drainage system 1 for a tunnel system with a—usually underground—drainage pipe 2 for draining waste water. In the example shown, the drainage pipe 2 is located underneath a roadway 3 in a tunnel, but it could also be used as a drainage pipe in other fields of application. Drainage pipes 2 for drainage systems usually have a size of DN 160-250, i.e., an inner diameter of 152 mm to 238 mm, but more generally also of 100 mm to 500 mm.

In order to make the drainage pipe 2 accessible under the roadway 3, for example, at least one drainage shaft 4 is arranged between the drainage pipe 2 and the roadway 3. Drainage shafts 4 are usually 60 cm to 100 cm deep and are at a distance of, for example, 60 m from each other. However, the distance between drainage shafts 4 can also be only 10 m or up to 200 m or more. The drainage pipe 2 runs upstream and downstream of the drainage shaft 4, i.e., the drainage pipe 2 does not have to be manufactured in one piece and can have interruptions such as the drainage shafts 4. The drainage cleaning system 1 is usually linear, but branches could also be provided, i.e., another drainage pipe could also start at the drainage pipe 2.

In the drainage cleaning system 1 according to the invention, a charging station 5 for a self-propelled cleaning robot 6 is provided as a cleaning unit in the at least one drainage shaft 4, as described below. However, it goes without saying that the charging station 5 can be arranged not only in a drainage shaft 4 but also at another location, for example, a separate recess or in/on the drainage pipe 2 itself.

The self-propelled, non-wired cleaning robot 6 is designed for moving down the drainage pipe 2 automatically, i.e., without human intervention, cleaning it in the process. For this purpose, the cleaning robot 6 has a battery, as described in detail below, which is charged by the charging station 5 at regular intervals in order to ensure continuous operation of the cleaning robot 6. As a rule, the cleaning robot 6 thus starts at a charging station 5, cleans the pipe section of the drainage pipe 2 up to the next charging station 5 and stops there in order to be charged again. If the cleaning robot 6 still has sufficient battery capacity, charging can even be omitted until the subsequent charging station 5. In order to give the cleaning robot 6 a self-propelled configuration, a program with one or more operating states can, for example, be provided, which is stored in a memory of the cleaning robot 6 and is executed by a microprocessor of the cleaning robot 6.

FIGS. 2 to 5 show an embodiment of the charging station 5 of the drainage cleaning system 1 according to the invention in detail. Accordingly, the charging station 5 is attached at its lower end to a section of the drainage pipe 2 so that the cleaning robot 6 can enter the charging station 6. In the area of the charging station 5, the drainage pipe 2 is open at the top so that the cleaning robot 6 can be lifted out of the inner circumference of the drainage pipe 2. For this purpose, the charging station 5 comprises a lifting device 7, which is equipped with a lifting seat 8. The lifting seat 8 is designed in such a way that it can engage the cleaning robot 6 in order to lift it. As soon as the cleaning robot 6 has been lifted, a charging point 9 couples to a corresponding contact on the cleaning robot 6, as a result of which a battery in the cleaning robot 6 can be charged. Instead of using a physical electrical contact, it could also be charged inductively.

The charging station 5 has suitable electronics for charging, which can be accommodated in a technical cabinet 10 arranged in the charging station 5. Since batteries are typically charged with direct current, the electronics can include a charging circuit necessary therefor. In addition, the electronics can exhibit suitable safety devices. The charging station 2 can in turn be connected to an external power source in order to charge the cleaning robot 6, for example, with the power grid or with locally provided photovoltaic cells or, respectively, other energy systems.

In order to install the charging station 5 in the drainage shaft 4, the charging station 5 comprises further structural measures such as a support frame 11 which can be mounted in the drainage shaft 4 in order to brace the charging station 2 in the drainage shaft 4. In this case, the support frame 11 carries the lifting device 7 and the technical cabinet 10 so that they are anchored in the drainage shaft 4 in a stationary manner. In this embodiment, the charging station 5 can be sold as a unit and can simply be installed in pre-existing drainage shafts 4. In order to seal off the charging station 5 from the roadway 3 during operation, the drainage shaft 4 can subsequently be covered with a lid 12.

Moreover, the charging station 5 comprises a transceiver designed for receiving measuring data recorded by the cleaning robot 6 and sending them to a server arranged outside of the drainage cleaning system 1. The transceiver can be arranged in the technical cabinet 10, for example. In order to receive the measuring data from the cleaning robot 6, they can be transmitted, for example, via the charging point 9, i.e., the interface for electrical charging can be the same as for data transmission.

Alternatively or additionally, a separate way of data transmission can also be provided, for example via NFC (Near Field Communication), DSRC (Dedicated Short Range Communication) or WLAN (Wireless Local Area Network). For this purpose, both the charging station 5 and the cleaning robot 6 can be equipped with appropriate transceivers. A separate physical contact could also be provided.

In order to send the measuring data received from the cleaning robot 6 to the server, the charging station 5 can be connected to the server via a cable. Alternatively or additionally, the charging station has a mobile radio module by means of which the charging station 5 can transmit the measuring data to the server via a mobile radio network, e.g., using UMTS, GSM, 4G or 5G. Different variants can be provided also in this case, for example, several charging stations 5 can be connected via cable or WLAN in order to share one mobile radio module or to communicate directly via WLAN with a server arranged in the tunnel or, respectively, in the surrounding area.

Instead of the structures shown in FIGS. 2-5, other options for constructing the charging station may also be provided, in particular if they are not arranged in a drainage shaft 4. For example, it would be possible not to move the cleaning robot upwards, but to one of the sides or even downwards in order to free the inner diameter of the drainage pipe 2. Alternatively, the lifting device 7 can also be omitted, for example, if the charging station is charged from a contact provided in the drainage pipe 1, via which also the measuring data are transmitted. Even if the cleaning robot 6 remains in the drainage pipe 6 during the charging process, water running off can normally flow past it even if the brush is stationary.

Figure 6:
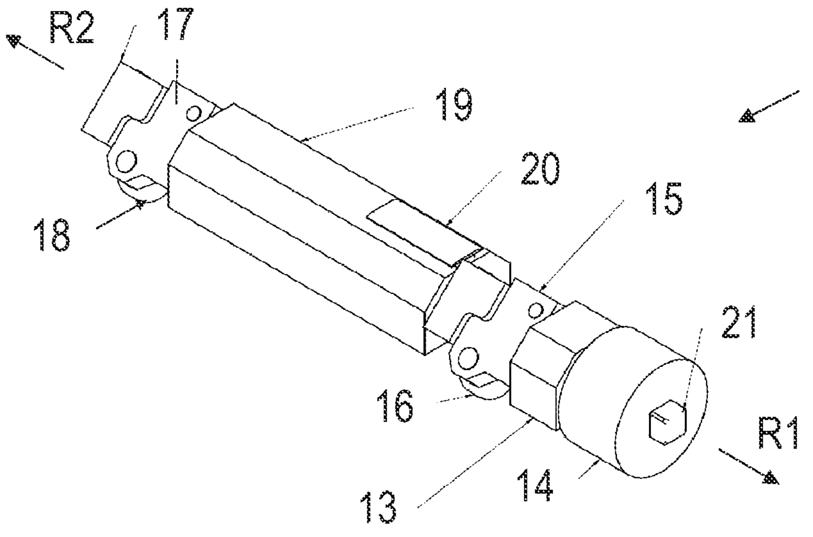
FIG. 6 shows the cleaning robot of FIG. 1 in a perspective view.
Figure 7:
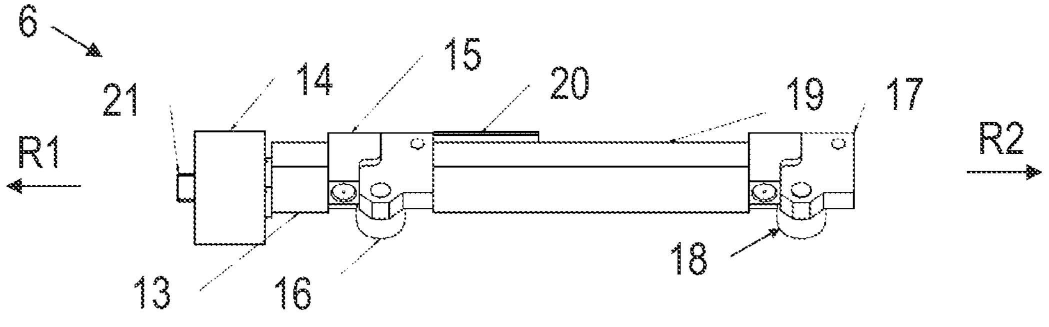
FIG. 7 shows the cleaning robot of FIG. 1 in a side view.

In FIGS. 6 and 7, the cleaning robot 6 is illustrated according to an embodiment. Accordingly, the cleaning robot 6 has a brush 14 driven by a cleaning drive 13 in order to clean the drainage pipe 2. For moving in the drainage pipe 2, the cleaning robot 6 has at least one traction drive 15 with at least one wheel 16. In addition, the cleaning robot may comprise further traction drives 17 or further wheels 18, respectively. A traction drive 15, 17 can also have several wheels 16, 18. Together, the cleaning drive 13 and the traction drives 15, 17 are referred to below as the drive of the cleaning robot 6.

A battery, which is arranged, for example, inside a base body 19 of the cleaning robot 6, serves as the energy supply for driving the cleaning robot 6. In this case, the base body 19 itself can have external contacts 20 for the charging point 9 of the charging station 5 and can be designed in such a way that it can be picked up by the lifting seat 8. If the cleaning robot 6 has a transceiver for communication with the charging station 5, this can also be arranged in the base body 19.

In order to record measuring data during cleaning, the cleaning robot 6 can be equipped with one or more sensors. The measuring data can be stored in a memory, which is located in the base body 19, for example, and can be deleted after the charging station 5 has been read out, or can be saved for a predetermined period of time. Thus, the measuring data of a complete passage through the drainage pipe 2 in one direction or also the measuring data of one or several days could be stored in the memory of the cleaning robot 6 in order to increase data security.

A sensor for recording measuring data can be a front camera 21, for example, which takes pictures or videos in a first direction of travel R1. In addition, a rear camera can be provided, which is attached to the opposite end of the cleaning robot 6, so that pictures or videos can be taken in a direction of travel R2 opposite to the first direction of travel R1. Pictures taken can be evaluated, for example, in order to monitor the cleaning success or to analyze the way in which the drainage pipe 2 has been laid or damaged.

Other measuring data can be, for example, temperatures or measurements of distances covered, i.e., length measurement values. Distances that have been covered are preferably determined using a dead reckoning system, since GPS reception is usually not possible in drainage pipes. In particular, the recording of slope data is advantageous, e.g., by means of a gyro sensor, since a lowering of the drainage pipe 2 can be determined in this way. The evaluation as to whether the drainage pipe 2 or, respectively, a section thereof sinks down can be carried out in particular in the cleaning robot 6, in the charging station 5 or in the server. In doing so, the evaluation can be performed as follows, for example. In a first step, the inclination of at least one section of the drainage pipe 2 is measured. In a second step, the inclination of the same section is measured again during a later passage of the drainage pipe 2. If it turns out that the inclination has changed over time, has increased in particular, it can be concluded that a roadway located above the drainage pipe 2 has sunk down.

In addition to sending measuring data from the cleaning robot 6 to the server via the charging station 5, it may also be envisaged that the charging station 5 sends control data received by the server to the cleaning robot 6 in order to change an operating state of the cleaning robot 6. For example, the travel speed or the speed of the rotation of the brush can be controlled. However, for example, the path to be followed in the drainage pipe 2 can also be changed, e.g., cleaning only half of the drainage pipe 2 instead of a total cleaning.

Said brush 14 can, for example, have bristles arranged around an axis so that, during a rotation or vibration around the axis, i.e., during operation, the brush 14 has a diameter of 100 mm to 500 mm. Other types of brushes can also be provided, for example non-driven brushes which do not have their own cleaning drive 13. In most embodiments, the brush 14 has a circular circumference (either if it is cylindrical by construction or if it becomes substantially cylindrical due to the rotation or vibration of bristles), as seen against the direction of travel R1, which substantially corresponds to a cross-section of the drainage tube 2. In this case, the travelling body of the cleaning robot 6, i.e., its drive 13, 15, 17 and its base body 19, lies within the circumference of the brush 14, as seen against the direction of travel R1.

Furthermore, the brush 14 can be designed in such a way that it increases the speed of waste water flowing in the direction of travel R1 even further when travelling in the direction of travel R1. This can be achieved, for example, by a staggered arrangement of bristles so that the brush 14 essentially receives the shape of an aircraft rotor.

Instead of or in addition to the above-mentioned embodiment, in which the charging station 5 has a transceiver, the cleaning robot 6 itself can have a transceiver for communicating with the server. This transceiver can be located, for example, in the base body 19 and, like the transceiver of the charging station 5, it can be a WLAN, UMTS, GSM, 4G or 5G transceiver. During cleaning, there is usually no communication link in the drainage pipe 2, for which reason the cleaning robot 6 also in this case waits until the charging station 5 enables a communication link to the server. This can be done, for example, in that the lifting device 7 lifts or pushes the cleaning robot 6 into a position in which there is a communication link. Alternatively, the charging station 5 can provide an interface by means of which the transceiver of the cleaning robot 6 can be coupled to an antenna of the charging station 5. Furthermore, a cable connection from the server could even be provided directly in the charging station 5 so that a memory of the cleaning robot 6 can be read out directly by the server.

Turning back to the overall layout of the self-cleaning drainage system 1 illustrated in FIG. 1, communication stations may also be provided in addition, which can basically be designed like the charging stations 5, but without assuming a charging function. As a rule, the communication stations also will not have a lifting seat 8, since the communication station will be in a communication link with the cleaning robot 6 only for a shorter period of time than the charging station 5 during a charging process. In the simplest case, the communication station is therefore a relay, which receives measuring data from the cleaning robot 6 and forwards them to the server.

In the drainage cleaning system 1, communication stations can be used in particular at the reversal points of the cleaning robot 6, e.g., at each end of the drainage cleaning system 1, for example also a few meters outside of the drainage pipe 2, so that the communication station is attached to the drainage pipe 2 only via a track.

In the simplest case, the drainage cleaning system 1 consists of a drainage pipe 2 in which a charging station 5 is arranged essentially in the middle. In this case, the drainage pipe 2 has a length on both sides which essentially corresponds to half the capacity of the battery of the cleaning robot 6. This is chosen because, with this, the cleaning robot 6 can turn around upon reaching one end of the drainage pipe 2 and can again arrive at the charging station 5 in order to be recharged there. For example, the battery can have a capacity of 100 m-2000 m, preferably 450 m-1200 m, driving meters. Regardless of the layout of the drainage system 1, the cleaning robot 6 can be programmed in such a way that it changes its direction of travel when half of the battery capacity is reached in order to again arrive at the last charging station 5 in the drainage pipe 2.

A plurality of charging stations 5 can also be arranged in the drainage cleaning system 1. Two charging stations 5 are arranged there, for example, at a mutual distance of 50 m to 1000 m, preferably 450 m to 600 m. In this case, the battery of the cleaning robot can have a capacity that corresponds to at least twice the length between two charging stations. This is because the cleaning robot 6 should continue to have sufficient battery capacity for reaching the last charging station 5 after an insurmountable obstacle has been detected just in front of a charging station 5. In general, the cleaning robot 6 can therefore be designed for going to the last charging station 5 that has been visited when an insurmountable obstacle is detected in the drainage cleaning system 1, in particular in the drainage pipe 2, and for sending an error message to the server via the charging station 5 upon reaching the latter.

The drainage cleaning system 1 can also have several cleaning robots 6, e.g., one per kilometer of drainage pipe 2. The combination of several charging stations 5 and several cleaning robots 6 can thus create a self-cleaning drainage cleaning system 1 of unlimited length that cleans itself almost continuously.

The invention claimed is:

1. A drainage cleaning system for a tunnel system, comprising a self-propelled cleaning robot, a drainage pipe, and a charging station on the drainage pipe, wherein the charging station is operable to charge the battery of the self-propelled cleaning robot located in the drainage pipe and to enable measuring data recorded by the self-propelled cleaning robot to be sent to a server arranged outside of the drainage cleaning system, wherein the charging station is arranged outside of an inner diameter of the drainage pipe and is operable to lift the self-propelled cleaning robot out of the inner diameter in order to charge the self-propelled cleaning robot outside of the inner diameter.

2. The drainage cleaning system according to claim 1, wherein the drainage cleaning system further includes a communication station on the drainage pipe, and the communication station is operable to receive measuring data recorded by the self-propelled cleaning robot and to send the measuring data to the above-mentioned server without charging the self-propelled cleaning robot.

3. The drainage cleaning system according to claim 1, comprising at least two of the charging stations, which are spaced apart from one another by a predetermined distance.

4. The drainage cleaning system according to claim 3, wherein the charging stations are arranged at a mutual distance of 50 m to 1000 m, preferably 450 m to 600 m.

5. The drainage cleaning system according to claim 1, wherein the charging station comprises a transceiver that is operable to receive measuring data recorded by the self-propelled cleaning robot and to send the data to a server arranged outside of the drainage cleaning system, using a mobile radio connection.

6. The drainage cleaning system according to claim 1, wherein the charging station is operable to send control data received by the server to the self-propelled cleaning robot in order to change an operating state of the self-propelled cleaning robot.

7. The drainage cleaning system according to claim 1, wherein the self-propelled cleaning robot comprises a drive operable to perform automated cleaning of the drainage cleaning system, a battery for the drive and at least one sensor operable to record measuring data, the self-propelled cleaning robot being operable to charge the battery using the charging station and to send measuring data recorded by the sensor to the charging station.

8. The drainage cleaning system according to claim 7, comprising a brush which, in operation, has a diameter of 100 mm to 500 mm, with the self-propelled cleaning robot further comprising a travelling body which is located within a circumference of the brush, as seen against a direction of travel.

9. The drainage cleaning system according to claim 8, wherein the self-propelled cleaning robot comprises a transceiver which is operable to send recorded measuring data directly to the server when the self-propelled cleaning robot is in the charging station.

10. The drainage cleaning system according to claim 7, wherein the recorded measuring data include slope data by way of which a lowering of the drainage pipe can be determined.

11. The drainage cleaning system according to claim 7, wherein the measuring data comprise temperatures, pH values, electrical conductivities of a fluid in the drainage pipe, measurements of distances travelled and image and/or video data recorded by a camera operable to monitor a cleaning success.

12. The drainage cleaning system according to claim 7, wherein the battery has a capacity of 450 m-1200 m, driving meters.

13. The drainage cleaning system according to claim 7, wherein the self-propelled cleaning robot is operable to go to the last charging station that has been visited when an insurmountable obstacle is detected in the drainage cleaning system and to send an error message to the server upon reaching the charging station.

* * * * *